US012070993B2

(12) United States Patent
Suzuki et al.

(10) Patent No.: US 12,070,993 B2
(45) Date of Patent: Aug. 27, 2024

(54) VEHICLE DRIVE DEVICE

(71) Applicants: AISIN CORPORATION, Kariya (JP);
TOYOTA JIDOSHA KABUSHIKI KAISHA, Toyota (JP)

(72) Inventors: Tomoyuki Suzuki, Anjo (JP); Naoya Odashima, Toyota (JP)

(73) Assignees: AISIN CORPORATION, Kariya (JP);
TOYOTA JIDOSHA KABUSHIKI KAISHA, Toyota (JP)

( * ) Notice: Subject to any disclaimer, the term of this patent is extended or adjusted under 35 U.S.C. 154(b) by 672 days.

(21) Appl. No.: 17/273,645

(22) PCT Filed: Dec. 6, 2019

(86) PCT No.: PCT/JP2019/047773
§ 371 (c)(1),
(2) Date: Mar. 4, 2021

(87) PCT Pub. No.: WO2020/188904
PCT Pub. Date: Sep. 24, 2020

(65) Prior Publication Data
US 2021/0316602 A1 Oct. 14, 2021

(30) Foreign Application Priority Data
Mar. 19, 2019 (JP) ................................. 2019-051545

(51) Int. Cl.
*B60K 1/00* (2006.01)
*B60L 15/00* (2006.01)
(Continued)

(52) U.S. Cl.
CPC ................ *B60K 1/00* (2013.01); *B60L 15/00* (2013.01); *H02K 5/20* (2013.01); *H02K 7/006* (2013.01)

(58) Field of Classification Search
CPC .... B60K 1/00; B60K 11/02; B60K 2001/001; B60K 2001/003; B60L 15/00;
(Continued)

(56) References Cited

U.S. PATENT DOCUMENTS 10,008,904 B2 * 6/2018 Kuramochi ............ B60K 6/405
11,440,394 B2 * 9/2022 Yaguchi ................... B60K 6/26
(Continued)

FOREIGN PATENT DOCUMENTS

JP     2008290621 A * 12/2008 ............... B60K 1/02
JP     2009201218 A * 9/2009 ............. B60K 6/405
(Continued)

OTHER PUBLICATIONS

Feb. 18, 2020 International Search Report issued in International Patent Application No. PCT/JP2019/047773.

*Primary Examiner* — James A Shriver, II
*Assistant Examiner* — Michael T. Walsh
(74) *Attorney, Agent, or Firm* — Oliff PLC

(57) ABSTRACT

A vehicle drive device includes a rotary electric machine, an inverter, and a case. The case includes a main body portion and a cover portion. The main body portion houses the rotary electric machine and at least a part of the inverter. The cover portion is joined to the main body portion so as to cover an opening portion of the main body portion. The inverter includes a cooler, a first unit that is fixed to the cooler so as to be along a first reference plane, and a second unit that is fixed to the cooler so as to be along a second reference plane. The cooler is fixed to the main body portion.

13 Claims, 4 Drawing Sheets

(51) Int. Cl.
*H02K 5/20* (2006.01)
*H02K 7/00* (2006.01)

(58) Field of Classification Search
CPC ........ B60L 15/007; H02K 5/20; H02K 7/006; H02K 5/04; H02K 11/33; B60Y 2400/61; Y02T 10/64; Y02T 10/72
See application file for complete search history.

(56) References Cited

U.S. PATENT DOCUMENTS

| | | | | |
|---|---|---|---|---|
| 2016/0039276 | A1* | 2/2016 | Takahashi | B60L 50/16 |
| | | | | 903/952 |
| 2016/0052380 | A1* | 2/2016 | Miyazawa | B60K 6/36 |
| | | | | 180/65.21 |
| 2016/0072361 | A1* | 3/2016 | Kuramochi | B60L 50/16 |
| | | | | 180/65.21 |
| 2016/0185232 | A1* | 6/2016 | Suzuki | B60K 31/06 |
| | | | | 903/945 |

FOREIGN PATENT DOCUMENTS

| | | | | | |
|---|---|---|---|---|---|
| JP | 2009-262858 | A | | 11/2009 | |
| JP | 2009262858 | A | * | 11/2009 | |
| JP | 2015-182505 | A | | 10/2015 | |
| JP | 2015182505 | A | * | 10/2015 | |
| WO | WO-2008032837 | A1 | * | 3/2008 | ............... B60K 6/26 |
| WO | 2014/192394 | A1 | | 12/2014 | |
| WO | WO-2016098646 | A1 | * | 6/2016 | ............... B60K 6/26 |

* cited by examiner

VEHICLE DRIVE DEVICE

TECHNICAL FIELD

The present disclosure is related to a vehicle drive device including a rotary electric machine that has a cylindrical shape, an inverter that drivingly controls the rotary electric machine, and a case for housing the rotary electric machine and the inverter.

BACKGROUND ART

For example, Japanese Unexamined Patent Application Publication No. 2009-262858 (JP 2009-262858 A) (Patent Document 1) discloses a vehicle drive device including a case that houses a rotary electric machine and an inverter. Hereinafter, the reference numerals shown in parentheses in the description of the background art are those of Patent Document 1.

In the vehicle drive device described in Patent Document 1, a rotary electric machine (MG1, MG2) and an inverter (11) are housed inside a case main body portion (2). A first cover (43) that covers an inverter unit (12), which configures a part of the inverter (11), at a first opening portion (41), and a second cover (44) that covers a smoothing capacitor (14), which configures a part of the inverter (11), at a second opening portion (42) are joined to the case main body portion (2). A joining surface of the first cover (43) and the case main body portion (2) is disposed along a disposition direction of the inverter unit (12), and an opening surface of the first opening portion (41) is also disposed along the disposition direction the inverter unit (12). Further, a joining surface of the second cover (44) and the case main body portion (2) is disposed along a disposition direction of the smoothing capacitor (14), and an opening surface of the second opening portion (42) is also disposed along the disposition direction of the smoothing capacitor (14).

Thus, in the vehicle drive device described in Patent Document 1, the first opening portion (41) for the inverter unit (12) and the second opening portion (42) for the smoothing capacitor (14) are each provided, and the covers (43, 44) are joined to the respective opening portions (41, 42).

RELATED ART DOCUMENTS

Patent Documents

Patent Document 1: Japanese Unexamined Patent Application Publication No. 2009-262858 (JP 2009-262858 A)

SUMMARY OF THE DISCLOSURE

Problem to be Solved by the Disclosure

By the way, in order to join the covers (43, 44) to the opening portions (41, 42) of the case main body portion (2), a flange portion needs to be formed so as to surround the opening portions (41, 42), or a fastening member such as a bolt needs to be attached. Thus, like the vehicle drive device described in Patent Document 1, when the vehicle drive device is configured such that the plurality of opening portions (41, 42) is provided corresponding to the inverter unit (12) and the smoothing capacitor (14) respectively, this configuration causes an increase in the size of the vehicle drive device, which may decrease mountability onto the vehicle. In contrast, when the number of the opening portions is reduced in order to reduce the size of the vehicle drive device, workability such as for assembling and removing, etc. of the inverter may be decreased.

In view of the above circumstances, it is required to realize a vehicle drive device that has satisfactory workability and mountability onto a vehicle.

Means for Solving the Problem

The characteristic configuration of the vehicle drive device in view of the above is a vehicle drive device including: a rotary electric machine that has a cylindrical shape; an inverter that drivingly controls the rotary electric machine; and a case for housing the rotary electric machine and the inverter, in which the case includes a main body portion and a cover portion, the main body portion houses the rotary electric machine and at least a part of the inverter, the cover portion is joined to the main body portion so as to cover an opening portion of the main body portion, a virtual plane parallel to a tangent plane set on an outer peripheral surface of the rotary electric machine is set as a first reference plane, and a virtual plane parallel to another tangent plane intersecting with the first reference plane is set as a second reference plane, the inverter includes a cooler, a first unit that is fixed to the cooler so as to be along the first reference plane, and a second unit that is fixed to the cooler so as to be along the second reference plane, and the cooler is fixed to the main body portion.

According to this configuration, since the first unit, the second unit, and the cooler are fixed to each other, the first unit, the second unit, and the cooler can be housed in the case in an integrated state. Thus, workability when housing the inverter, which includes each of the above units, in the case can be improved. Further, since the first unit, the second unit, and the cooler can be housed in the main body portion from the common opening portion in a state in which the first unit, the second unit, and the cooler are integrated, there is no need to provide a plurality of opening portions or housing spaces each corresponding to the plurality of units, and the increase in size of the case can be suppressed. Thus, according to this configuration, it is possible to realize a vehicle drive device that has good workability and mountability onto a vehicle.

Further features and advantages of the techniques according to the present disclosure will be further clarified by the following description of the embodiments that are exemplary and non-limiting, which will be described with reference to the drawings.

MODES FOR CARRYING OUT THE DISCLOSURE

A vehicle drive device according to the present embodiment is mounted on, for example, a hybrid vehicle in which an internal combustion engine and a rotary electric machine are used as a driving force source for a plurality of wheels, or an electric vehicle in which a rotary electric machine is used as a driving force source for a plurality of wheels. The "rotary electric machine" is a concept including any of a motor (electric motor), a generator, and a motor/generator that functions as both a motor and a generator if necessary. Hereinafter, the vehicle drive device according to the present embodiment will be described with reference to the drawings.

[Overall Configuration of Vehicle Drive Device]

First, a schematic configuration of a vehicle drive device 100 will be described with reference to FIGS. 1 and 2.

The vehicle drive device 100 includes: a rotary electric machine 1 that has a cylindrical shape; an inverter 6 that drivingly controls the rotary electric machine 1; and a case 7 (see also FIG. 3) for housing the rotary electric machine 1 and the inverter 6.

Figure 1:
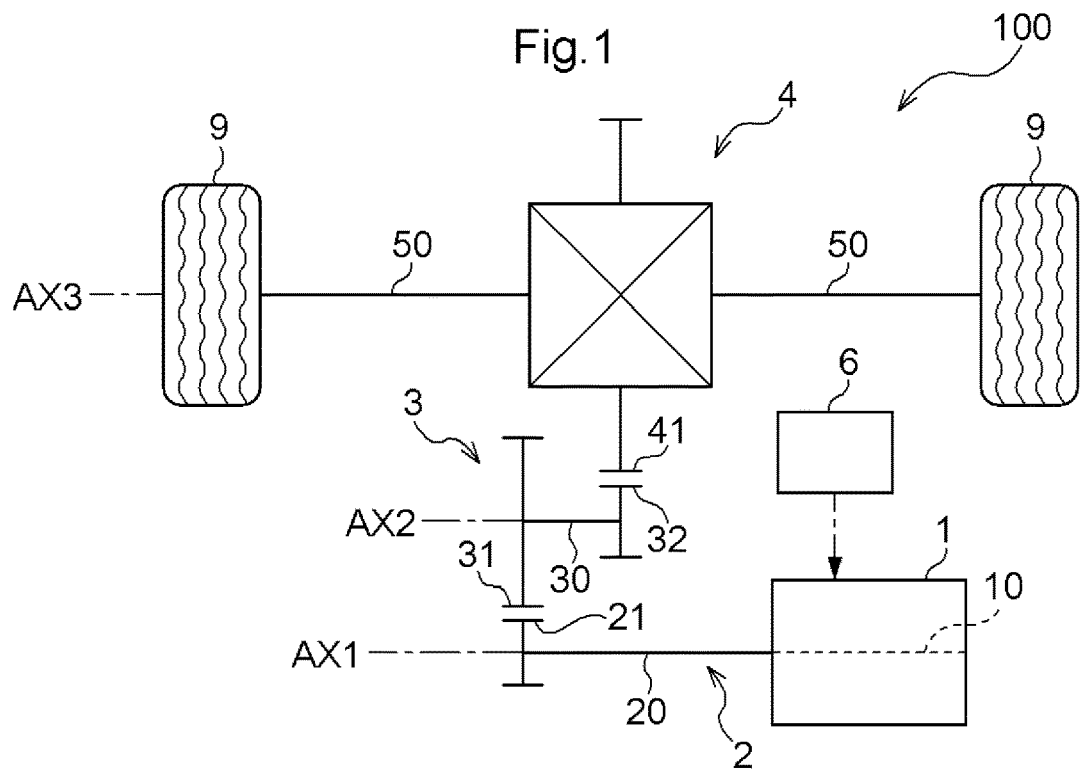
FIG. 1 is a skeleton diagram of a vehicle drive device.
Figure 2:
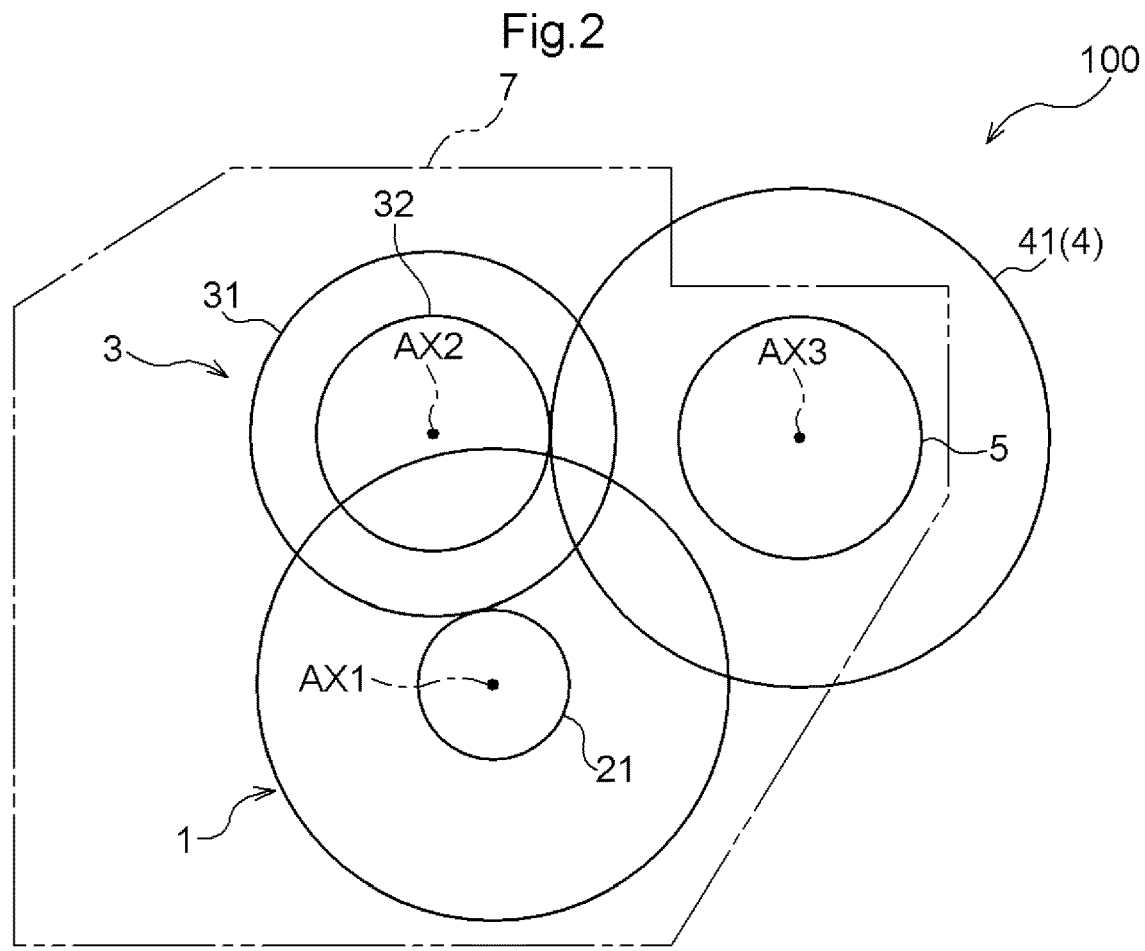
FIG. 2 is an axial view schematically showing a disposition configuration of each gear mechanism.

As shown in FIG. 1, the vehicle drive device 100 transmits a driving force between the rotary electric machine 1, which is a driving force source, and a pair of wheels 9. In the present embodiment, the vehicle drive device 100 includes, in a power transmission path that connects the rotary electric machine 1 (driving force source) and the pair of wheels 9, an input member 2 drivingly coupled to the rotary electric machine 1 (driving force source), and a differential gear device 4 that distributes the driving force transmitted from the rotary electric machine 1 (driving force source) side to the pair of wheels 9 via a pair of output shafts 50 (drive shafts). In this example, the vehicle drive device 100 further includes a counter gear mechanism 3 provided between the input member 2 and the differential gear device 4 in the power transmission path.

In the present embodiment, the rotary electric machine 1 and the input member 2 are disposed on a first axis AX1. The counter gear mechanism 3 is disposed on a second axis AX2. The differential gear device 4 and the output shafts 50 (pair of output shafts 50) are disposed on a third axis AX3. The first axis AX1, the second axis AX2, and the third axis AX3 are all virtual axes, and are disposed in parallel to each other at different positions from each other. Hereinafter, unless otherwise specified, an "axial direction" is defined as a direction parallel to these axes AX1 to AX3, and a "radial direction" shall be defined with reference to the axial direction.

Although detailed illustration is omitted, in the present embodiment, the rotary electric machine 1 includes a stator fixed to the case 7, a rotor disposed so as to face the stator in the radial direction, and a rotor shaft 10 that rotates integrally with the rotor. In this example, the rotor shaft 10 is disposed on the first axis AX1.

The input member 2 includes an input shaft 20 and an input gear 21 that is fixed to the input shaft 20 and that rotates integrally with the input shaft 20. In this example, the input shaft 20 is disposed on the first axis AX1 and is coupled so as to rotate integrally with the rotor shaft 10 of the rotary electric machine 1 at an end portion in the axial direction. The input gear 21 is a gear that transmits the driving force from the rotary electric machine 1 that is the driving force source to the counter gear mechanism 3.

The counter gear mechanism 3 includes a counter shaft 30, and a first gear 31 and a second gear 32 that are fixed to the counter shaft 30 and that rotate integrally with the counter shaft 30. In this example, the counter shaft 30 is disposed on the second axis AX2. As shown in FIG. 2, the first gear 31 meshes with the input gear 21 of the input member 2. The first gear 31 is formed to have a larger diameter than the input gear 21. Therefore, the rotation transmitted from the input gear 21 to the first gear 31 is decelerated. The second gear 32 meshes with a differential input gear 41 of the differential gear device 4. The second gear 32 is formed to have a smaller diameter than the first gear 31.

The differential gear device 4 includes the differential input gear 41. The differential input gear 41 meshes with the second gear 32 of the counter gear mechanism 3. The differential gear device 4 distributes the driving force, which is transmitted from the rotary electric machine 1 to the differential input gear 41 via the input member 2 and the counter gear mechanism 3, to the output shaft 50 that is drivingly coupled to each of the pair of wheels 9. In this example, the differential gear device 4 is disposed on the third axis AX3. Although detailed illustration is omitted, in addition to the differential input gear 41 described above, the differential gear device 4 includes, for example, a differential case, a pinion shaft, a pair of pinion gears and a pair of side gears composed of bevel gears.

The output shaft 50 is a shaft member that drivingly couples the differential gear device 4 and the wheels 9. In this example, the output shaft 50 is disposed on the third axis AX3.

With the above configuration, a power transmission path is formed between the rotary electric machine 1 that is a driving force source and the wheels 9, and the driving force from the rotary electric machine 1 is transmitted to the wheels 9 via each member. The inverter 6 drivingly controls the rotary electric machine 1 so as to generate a desired torque in accordance with the torque required to be transmitted to the wheels 9. The torque required to be transmitted to the wheels 9 (required torque) is determined in accordance with an operation amount of an accelerator pedal, an operation amount of a brake pedal, etc. of the vehicle on which the vehicle drive device 100 is mounted.

[Structure of Main Part of Vehicle Drive Device]

Next, the configuration of a main part of the vehicle drive device 100 will be described with reference to FIG. 3.

Hereinafter, a virtual plane parallel to a first tangent plane set on an outer peripheral surface 11 of the rotary electric machine 1 is set as a first reference plane FR1, and a virtual plane parallel to a second tangent plane intersecting with the first reference plane FR1 is set as a second reference plane FR2. In this example, the first reference plane FR1 and the second reference plane FR2 are orthogonal to each other.

Further, in an axial view with reference to the rotation shaft (rotor shaft 10) of the rotary electric machine 1, a direction along the first reference plane FR1 is set as a first direction X, and one side in the first direction X is set as a first direction first side X1 and the other side in the first direction X is set as a first direction second side X2. In this example, in the first direction X, the side from a second wall portion W2 toward a third wall portion W3 of the case 7 is the first direction first side X1, and the opposite side thereof is the first direction second side X2. Further, in an axial view, a direction along the second reference plane FR2 is set as a second direction Y, and one side in the second direction Y is set as a second direction first side Y1 and the other side in the second direction Y is set as a second direction second side Y2. In this example, in the second direction Y, the side from a fourth wall portion W4 of the case 7 toward a first wall portion W1 of the case 7 is the second direction first side Y1, and the opposite side thereof is the second direction second side Y2. In other words, in the second direction Y, the side from an opening portion 710 of the main body portion 71 of the case 7 toward the inside of the main body portion 71 is the second direction second side Y2, and the opposite side thereof is the second direction first side Y1. In the illustrated example, the first direction X is the direction along a vehicle front-rear direction, and the second direction Y is the direction along an up-down direction.

Figure 3:
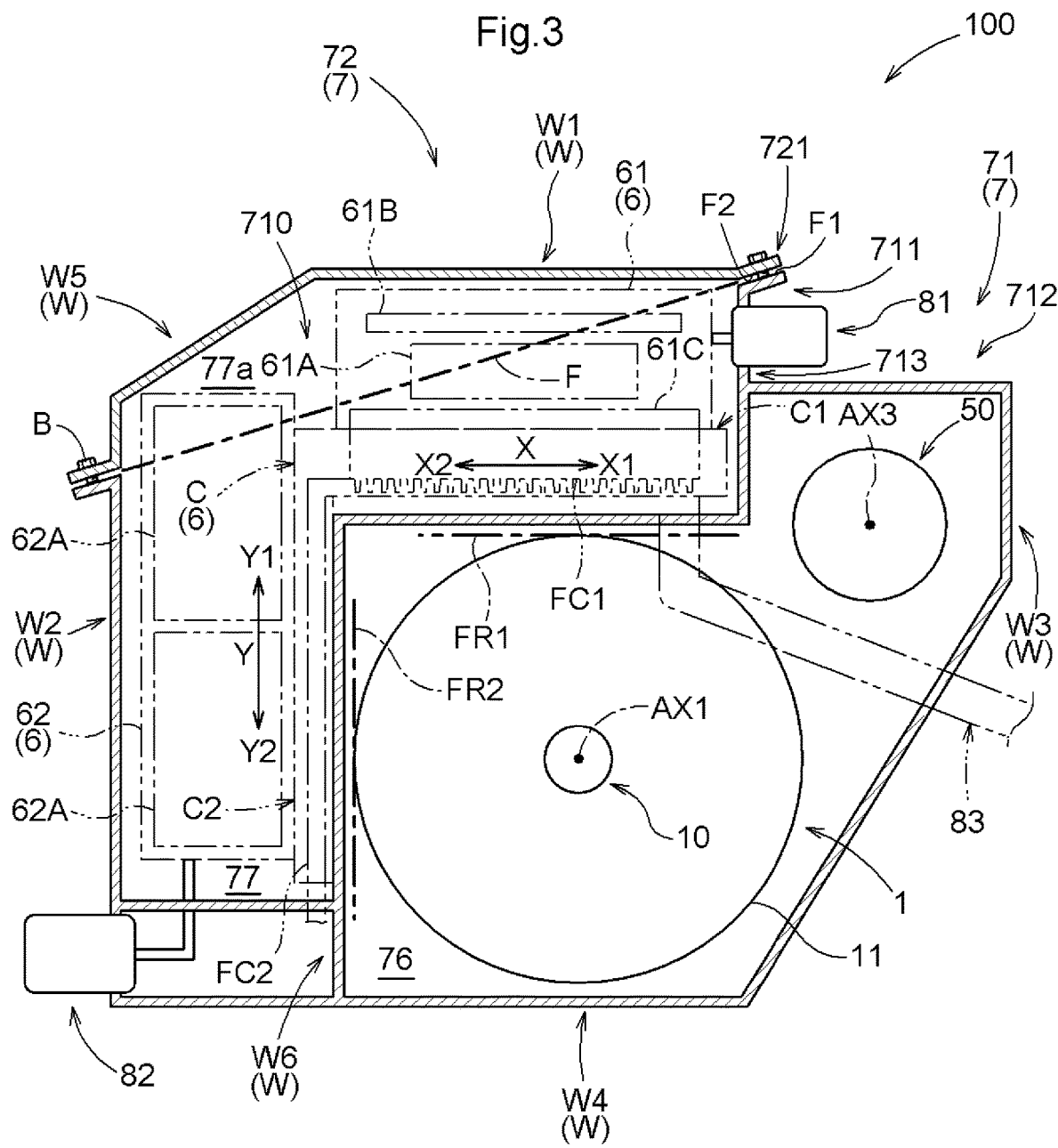
FIG. 3 is an axial view schematically showing a main part of the vehicle drive device.

As shown in FIG. 3, the rotary electric machine 1 and the inverter 6 are disposed inside the case 7. The inverter 6 includes a cooler C, a first unit 61 that is fixed to the cooler C so as to be along the first reference plane FR1, and a second unit 62 that is fixed to the cooler C so as to be along the second reference plane FR2.

In the present embodiment, the output shaft 50 (corresponding to a rotating body) that has a rotation shaft with a different shaft from the rotation shaft (rotor shaft 10) of the rotary electric machine 1 is disposed inside the case 7 and more to the first direction first side X1 than the first unit 61. In this example, a part of the output shaft 50 (a part in the axial direction) is disposed in an area overlapping with a disposition area of the rotary electric machine 1 in the axial direction, and a part of the output shaft 50 is housed inside the case 7. Further, in this example, the input gear 21, the counter gear mechanism 3, and the differential gear device 4 described above are disposed in an axial area different from the disposition area of the rotary electric machine 1 in the axial direction, and the input gear 21, the counter gear mechanism 3, and the differential gear device 4 are also housed inside the case 7.

The rotary electric machine 1 includes the outer peripheral surface 11 having a cylindrical shape. The outer peripheral surface 11 is defined by, for example, an outer peripheral surface of the stator having a cylindrical shape. As described above, the first reference plane FR1 and the second reference plane FR2 are defined based on the tangent plane set on the outer peripheral surface 11 of the rotary electric machine 1.

In the present embodiment, the first unit 61 of the inverter 6 includes a switching element unit 61A including a plurality of switching elements configuring an inverter circuit, an inverter control device 61B (control board) for controlling the inverter circuit, and a heat sink 61C for cooling the switching element unit.

It is preferable that a power semiconductor element capable of operating at a high frequency, such as an insulated gate bipolar transistor (IGBT), a power metal oxide semiconductor field effect transistor (MOSFET), a silicon carbide-metal oxide semiconductor FET (SiC-MOSFET), a SiC-static induction transistor (SiC-SIT), and a gallium nitride-MOSFET (GaN-MOSFET) be applied to the switching elements of the switching element unit 61A.

The inverter control device 61B is constructed with a logic circuit such as a microcomputer as a core member. For example, the inverter control device performs a feedback control using a current vector control method based on a target torque of the rotary electric machine 1 provided as a request signal from another control device, etc. such as a vehicle electronic control unit (ECU), and the inverter control device controls the rotary electric machine 1 via the inverter circuit.

The heat sink 61C is formed of a material having thermal conductivity (for example, a metal such as aluminum or copper, a heat conductive resin, or the like). For example, the heat sink 61C includes a plurality of heat radiation fins. When a coolant (for example, cooling water) flows between the plurality of heat radiation fins, heat exchange between the coolant and the heat radiation fins is performed. The surface of the heat sink 61C facing the opposite side of the surface on which the heat radiation fins are provided is a mounting surface on which the switching element unit 61A is mounted. As a result, the switching element unit is cooled via the heat sink 61C. In the present embodiment, the vehicle drive device 100 includes a coolant flow path 83 that supplies coolant from the outside to the inside of the case 7. The coolant flow path 83 is connected to the heat sink 61C of the first unit 61 inside the case 7, and is connected to a cooling device (for example, a radiator), not shown, outside the case 7.

In the present embodiment, the second unit 62 of the inverter 6 includes a smoothing capacitor 62A. The smoothing capacitor 62A is connected in parallel to a direct current side terminal in the inverter circuit of the first unit 61, and smoothes a voltage of a direct current power source.

In the present embodiment, the cooler C includes a first mounting surface C1 to which the first unit 61 is mounted and a second mounting surface C2 to which the second unit 62 is mounted. Here, the first mounting surface C1 is formed along the first reference plane FR1, and the second mounting surface C2 is formed along the second reference plane FR2. Further, the cooler C of the inverter 6 has a first cooling surface FC1 that is along the first reference plane FR1 and that cools the first unit 61, and a second cooling surface FC2 that is along the second reference plane FR2 and that cools the second unit 62. The first cooling surface FC1 is in contact with coolant flowing through the coolant flow path 83. In this example, the first cooling surface FC1 is configured of a surface of the heat sink 61C provided with heat radiation fins. The second cooling surface FC2 is in contact with coolant flowing through the coolant flow path 83.

In the present embodiment, each of the first unit 61 and the second unit 62 is disposed on the opposite side of the cooler C from the rotary electric machine 1 side. In this example, the first unit 61, the second unit 62, and the cooler C are housed in an inverter housing chamber 77, which will be described later. Further, the rotary electric machine 1 is housed in a rotary electric machine housing chamber 76, which will be described later. The cooler C is disposed along a boundary between the inverter housing chamber 77 and the rotary electric machine housing chamber 76.

As shown in FIG. 3, in the present embodiment, the second unit 62 is disposed more to the first direction second side X2 than the first unit 61. In this example, an end portion of the second direction first side Y1 of the second unit 62 is disposed more to second direction second side Y2 than an end portion of the second direction first side Y1 in the first unit 61. Then, a non-disposition area 77a in which neither the first unit 61 nor the second unit 62 is disposed, is formed on the first direction second side X2 with respect to the first unit 61 and on the second direction first side Y1 with respect to the second unit 62.

The case 7 includes a plurality of wall portions W surrounding a housing space for housing the rotary electric machine 1 and the inverter 6. In the present embodiment, the case 7 has the first wall portion W1 disposed along the first reference plane FR1 so as to cover the first unit 61, and the second wall portion W2 disposed along the second reference plane FR2 so as to cover the second unit 62. The case 7 further includes the third wall portion W3 disposed so as to face the second wall portion W2, the fourth wall portion W4 disposed so as to face the first wall portion W1, a connecting wall portion W5 that connects the first wall portion W1 and the second wall portion W2, and a defining wall portion W6 provided inside the case 7.

Further, the case 7 has the main body portion 71 and a cover portion 72. The main body portion 71 houses the rotary electric machine 1 and at least a part of the inverter 6. The cover portion 72 is joined to the main body portion 71 so as to cover the opening portion 710 of the main body portion 71. A joining plane F is formed at a joint part between the main body portion 71 and the cover portion 72. Here, the joining plane F is a virtual plane including a part in which the main body portion 71 and the cover portion 72 are joined, and an opening surface of the opening portion 710.

The first wall portion W1 is disposed more to the second direction first side Y1 than the opening portion 710. In this example, the first wall portion W1 is configured by the cover portion 72. The second wall portion W2 is disposed more to the first direction second side X2 than the opening portion 710. In this example, the second wall portion W2 is configured of a part of the main body portion 71 and a part of the cover portion 72. The third wall portion W3 is disposed more to the first direction first side X1 than the opening portion 710. In this example, the third wall portion W3 is configured by the main body portion 71. Further, the third wall portion W3 configures an end portion of the first direction first side X1 in the case 7. The fourth wall portion W4 is disposed more to the second direction second side Y2 than the opening portion 710. In this example, the fourth wall portion W4 is configured by the main body portion 71. Further, the fourth wall portion W4 configures an end portion of the second direction second side Y2 in the case 7.

The connecting wall portion W5 is provided so as to connect an end portion of the first wall portion W1 on the first direction second side X2 and the end portion of the second wall portion W2 on the second direction first side Y1. In this example, toward the first direction second side X2, the connecting wall portion W5 is inclined in the direction toward the second direction second side Y2. Further, the connecting wall portion W5 is configured by the cover portion 72. The connecting wall portion W5 is formed by disposing a wall portion of the case 7 on the inner side by utilizing the non-disposition area 77a described above. Specifically, the connecting wall portion W5 is formed so as to be inclined with respect to the first wall portion W1 and the second wall portion W2 by disposing on the inner side, the wall portion near a corner portion that is on the first direction second side X2 and on the second direction first side Y1 in the case 7, compared to the case in which the first wall portion W1 is extended to the first direction second side X2 and the second wall portion W2 is extended to the second direction first side Y1.

Inside the case 7, the defining wall portion W6 defines the rotary electric machine housing chamber 76 in which the rotary electric machine 1 is housed and the inverter housing chamber 77 in which the inverter 6 is housed. In this example, the defining wall portion W6 is disposed inside the case 7 so as to connect the third wall portion W3 and the fourth wall portion W4.

The rotary electric machine 1 is housed in the rotary electric machine housing chamber 76. Thus, there is oil for cooling the rotary electric machine 1 and for lubricating a bearing that supports the rotor shaft 10, inside the rotary electric machine housing chamber 76. The defining wall portion W6 defines the inside of the case 7 so that the oil inside the rotary electric machine housing chamber 76 does not enter the inverter housing chamber 77. In this example, the rotary electric machine housing chamber 76 houses the output shaft 50 (a part of the output shaft 50), other than the rotary electric machine 1.

The inverter housing chamber 77 is a housing chamber that is sealed so that the oil scattered inside the case 7 does not enter. In this example, the inverter housing chamber 77 houses the first unit 61 and the second unit 62 provided in the inverter 6.

The main body portion 71 of the case 7 houses the rotary electric machine 1, and also houses the inverter 6 so that at least a part of the inverter 6 protrudes from the opening portion 710 of the main body portion 71. That is, at least a part of the inverter 6 protrudes from the opening portion 710. In the present embodiment, both a part of the first unit 61 and a part of the second unit 62 protrude from the opening portion 710. The cooler C to which both the first unit 61 and the second unit 62 are fixed is fixed to the main body portion 71.

Further, in the present embodiment, the main body portion 71 has a main body flange portion 711 that forms a main body side joining surface portion F1, which is the joining plane F on the main body portion 71 side, and that is formed so as to protrude outward from the outer wall of the main body portion 71 along the joining plane F. In this example, the main body flange portion 711 is formed so as to protrude outward along the joining plane F, from an end portion on the second direction first side Y1 of the third wall portion W3, on the first direction first side X1 of the opening portion 710. The main body flange portion 711 is formed so as to protrude outward from the second wall portion W2 along the joining plane F, on the first direction second side X2 of the opening portion 710. Although detailed illustration is omitted, a through hole through which a connecting member B (for example, a bolt) that joins the main body portion 71 and the cover portion 72 extends is formed in the main body flange portion 711.

In the present embodiment, the main body portion 71 includes the third wall portion W3 mentioned above. More specifically, the main body portion 71 includes the third wall portion W3 that covers the rotary electric machine 1 and the inverter 6, on the first direction first side X1 of the first unit 61.

In this example, the third wall portion W3 includes a bulge portion 712 that bulges to the first direction first side X1, on the second direction second side Y2 of the main body flange portion 711. Further, the third wall portion W3 includes a connecting portion 713 that connects the main body flange portion 711 and the bulge portion 712. The bulge portion 712 bulges from the connecting portion 713 to the first direction first side X1.

The cover portion 72 is joined to the main body portion 71 so as to house a part of the inverter 6 protruding from the opening portion 710 and so as to cover the opening portion 710. That is, the cover portion 72 houses the part of the inverter 6 protruding from the opening portion 710. In the present embodiment, the cover portion 72 houses both a part of the first unit 61 and a part of the second unit 62.

In the present embodiment, the cover portion 72 has a cover flange portion 721 that forms a cover side joining surface portion F2, which is the joining plane F on the cover portion 72 side, and that is formed so as to protrude outward from the outer wall of the cover portion 72 along the joining plane F. In this example, the cover flange portion 721 is formed so as to protrude outward along the joining plane F, from an end portion on the first direction first side X1 of the first wall portion W1, on the first direction first side X1 of the opening portion 710. The cover flange portion 721 is formed so as to protrude outward from the second wall portion W2 along the joining plane F, on the first direction second side X2 of the opening portion 710. Although detailed illustration is omitted, a through hole through which the connecting member B (for example, a bolt) that joins the main body portion 71 and the cover portion 72 extends is formed in the cover flange portion 721. The connecting member B is inserted into the through hole formed in the cover flange portion 721 and the through hole formed in the main body flange portion 711 described above, so as to join the main body portion 71 and the cover portion 72.

In the present embodiment, the cover portion 72 includes the above-mentioned first wall portion W1 and the connecting wall portion W5. Further, in this example, a part of the second wall portion W2 is formed on the cover portion 72.

The main body flange portion 711 and the cover flange portion 721 that are joined to each other are formed so as to protrude toward the outside of the case 7 with respect to at least one of the first wall portion W1 and the second wall portion W2. In the present embodiment, the main body flange portion 711 and the cover flange portion 721 protrude toward the outside of the case 7 with respect to both the first wall portion W1 and the second wall portion W2.

Here, as shown in FIG. 3, the joining plane F at which the main body portion 71 and the cover portion 72 are joined is inclined with respect to both the first reference plane FR1 and the second reference plane FR2. The opening surface of the opening portion 710 is also inclined with respect to both the first reference plane FR1 and the second reference plane FR2. Thus, the opening portion 710 is also provided so as to be inclined with respect to both the first unit 61 disposed along the first reference plane FR1 and the second unit 62 disposed along the second reference plane FR2. With such a configuration, it is possible to secure a wide opening area of the opening portion 710 corresponding to the part (inverter housing chamber 77) of the main body portion 71 that houses the inverter 6. Since a part of the inverter 6 protrudes from the opening portion 710 having a wide opening area, in a state in which the cover portion 72 is removed from the main body portion 71, workability such as for assembling and removing the inverter 6 can be easily ensured when manufacturing or repairing the vehicle drive device 100. Further, when opening portions corresponding to each of the first unit 61 and the second unit 62 are provided separately, a cover member needs to be joined to each of the separate opening portions, and a flange portion or the like is needed around each opening portion. According to the configuration of the present embodiment, the plurality of opening portions can be combined into one opening portion 710. Thus, it is possible to suppress the increase in size of the case 7.

In the present embodiment, toward the first direction second side X2, the joining plane F is inclined to the second direction second side Y2. Toward the first direction second side X2, the opening surface of the opening portion 710 is also inclined to the second direction second side Y2. As a result, the joining plane F of the main body portion 71 and the cover portion 72, in other words, both the main body flange portion 711 forming the main body side joining surface portion F1 and the cover flange portion 721 forming the cover side joining surface portion F2, can be suppressed from being disposed in the corner portion that is on the first direction second side X2 and on the second direction first side Y1, in the case 7.

In the present embodiment, the end portions on the first direction second side X2 of the main body flange portion 711 and the cover flange portion 721 are disposed more to the second direction second side Y2 than the non-disposition area 77a described above. This also suppresses both the main body flange portion 711 and the cover flange portion 721 from being disposed at the corner portion that is on the first direction second side X2 and on the second direction first side Y1 in the case 7.

In the present embodiment, the connecting wall portion W5 is disposed at the corner portion of that is on the first direction second side X2 and on the second direction first side Y1 in the case 7. As described above, the connecting wall portion W5 is formed so as to be inclined with respect to the first wall portion W1 and the second wall portion W2 so that the wall portion of the case 7 is disposed inside by utilizing the non-disposition area 77a. As a result, the shape of the case 7 is such that the corner portion does not protrude, and mountability onto the vehicle is improved.

In the present embodiment, the end portions on the first direction first side X1 of the main body flange portion 711 and the cover flange portion 721 are disposed more to the first direction second side X2 than the end portion of the bulge portion 712 on the first direction first side X1. In other words, the end portions on the first direction first side X1 of the main body flange portion 711 and the cover flange portion 721 are disposed in an area (an area on a center side) other than the end portion area of the first direction X in the case 7. Therefore, the end portions on the first direction first side X1 of the main body flange portion 711 and the cover flange portion 721 are disposed at positions avoiding the corner portion that is on the first direction first side X1 and on the second direction first side Y1 in the case 7. As a result, the entire shape of the case 7 is such that the corner portion does not protrude, and mountability onto the vehicle is improved.

As shown in FIG. 3, in the present embodiment, a first connecting portion 81, which is a connecting portion between the first unit 61 and the outside of the case 7, is provided in the third wall portion W3, on the second direction second side Y2 of the main body flange portion 711 and on the second direction first side Y1 of the bulge portion 712. In the present embodiment as described above, the end portions of the main body flange portion 711 (and the cover flange portion 721) on the first direction first side X1 are disposed more to the first direction second side X2 than the end portion of the bulge portion 712 on the first direction first side X1. Thus, as described above, the first connecting portion 81 is disposed by using the part of the third wall portion W3 adjacent to the second direction second side Y2 of the main body flange portion 711, and the first connecting portion 81 is suppressed from protruding more to the first direction first side X1 than the case 7 (more specifically, the bulge portion 712). As a result, it is possible to prevent the entire vehicle drive device 100 including the first connecting portion 81 from becoming larger in size on the first direction first side X1. In the illustrated example, the first connecting portion 81 is provided in the connecting portion 713 in the third wall portion W3.

In the present embodiment, the first connecting portion 81 is an interface for a low voltage (for example, 12 V to 24 V). The first connecting portion 81 includes, for example, a power terminal that supplies power from a low-voltage battery (not shown) to the first unit 61, and a signal line that transmits a control signal from a higher-level control device (for example, a vehicle ECU) to an inverter control device.

Further, in the present embodiment, a second connecting portion 82, which is a connecting portion between the second unit 62 and the outside of the case 7, is provided in a part that configures the second wall portion W2 of the main body portion 71. In the illustrated example, the second connecting portion 82 is provided in the end portion area of the second wall portion W2 on the second direction second side Y2. As described above, the second connecting portion 82 is disposed at a position avoiding the corner portion that on the first direction second side X2 and on the second direction first side Y1 in the case 7.

In the present embodiment, the second connecting portion 82 is an interface for a high voltage (for example, 200 V to 400 V). The second connecting portion 82 includes a power terminal that supplies power from a high-voltage battery (not shown) to the second unit 62.

[Assembly of Inverter]

Next, the assembly of the inverter 6 to the case 7 and the structure thereof and the like will be described.

Figure 4:
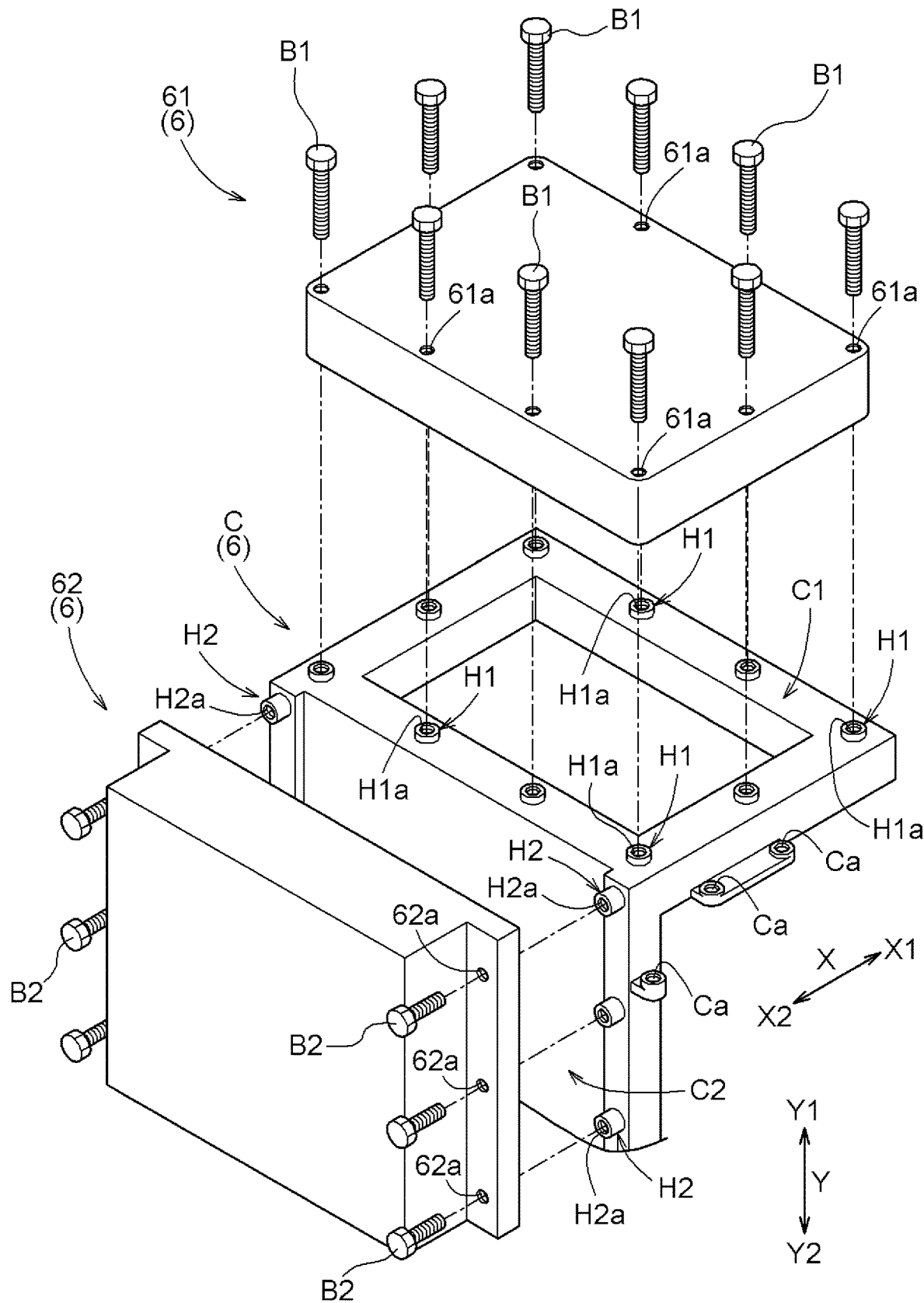
FIG. 4 is a perspective view schematically showing a cooler, a first unit, and a second unit.
Figure 5:
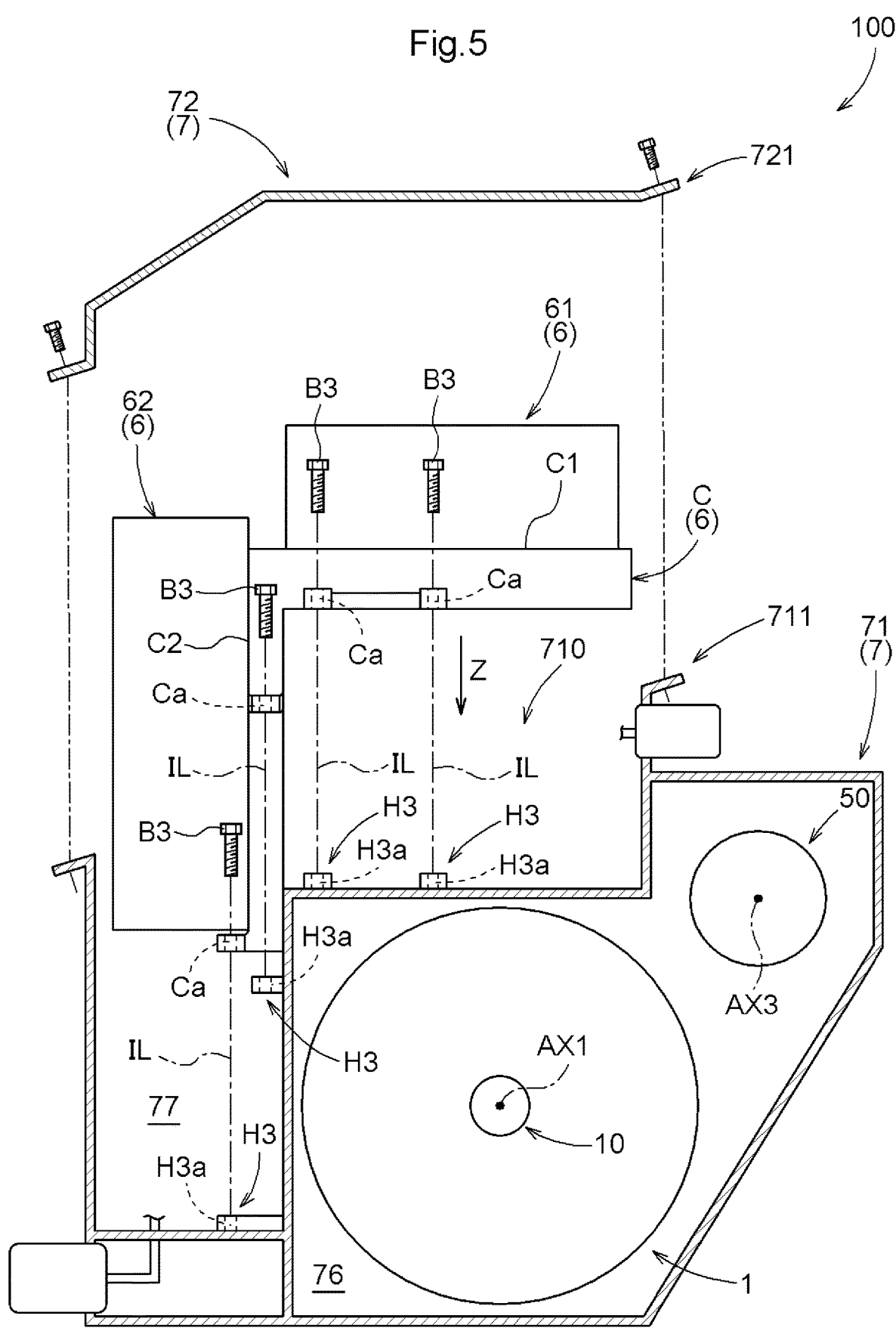
FIG. 5 is a schematic view showing how the cooler is assembled to a case.

As shown in FIGS. 3 to 5, the inverter 6 includes the cooler C and the first unit 61 and the second unit 62 that are fixed to the cooler C. Then, the cooler C is fixed to the main body portion 71 of the case 7 in a state in which the first unit 61 and the second unit 62 are fixed to the cooler C. When assembling the inverter 6 to the case 7, the first unit 61 and the second unit 62 are fixed to the cooler C to be integrated thereto, and then the cooler C is fixed to the main body portion 71 of the case 7. As a result, the cooler C, the first unit 61, and the second unit 62 are fixed to the case 7.

FIG. 4 is a perspective view schematically showing the cooler C, the first unit 61, and the second unit 62. In the present embodiment, the cooler C includes the first mounting surface C1 that is along the first reference plane FR1 and to which the first unit 61 is mounted, and the second mounting surface C2 that is along the second reference plane FR2 and to which the second unit 62 is mounted.

Further, in the present embodiment, the first mounting surface C1 includes first fixing portions H1 to which the first unit 61 is fixed. The first unit 61 is fixed to the first fixing portions H1 by a plurality of first fastening members B1. The first fastening members B1 are shaft-shaped fastening members such as bolts. The first fixing portions H1 include first fastening holes H1a into which the plurality of first fastening members B1 are each inserted. The first unit 61 is fixed to the first fixing portions H1 by inserting the first fastening members B1 into the first insertion holes 61a formed in the first unit 61 and into the first fastening holes H1a. In this example, a female screw is formed on an inner peripheral surface of each first fastening hole H1a, and by having the female screw screwed with a male screw formed on an outer peripheral surface of each first fastening member B1, the first fastening members B1 and the first fastening holes H1a are fastened. Thus, the first unit 61 is fixed to the first fixing portions H1. For example, a plurality of (ten in the illustrated example) first insertion holes 61a are formed along an outer edge of the first unit 61, and the same number of first fastening holes H1a (first fixing portions H1) as the first insertion holes 61a are formed at positions corresponding to each of the first insertion holes 61a on the first mounting surface C1.

In the present embodiment, the second mounting surface C2 includes second fixing portions H2 to which the second unit 62 is fixed. The second unit 62 is fixed to the second fixing portions H2 by a plurality of second fastening members B2. The second fastening members B2 are shaft-shaped fastening members such as bolts. The second fixing portions H2 include second fastening holes H2a into which the plurality of second fastening members B2 is each inserted. The second unit 62 is fixed to the second fixing portions H2 by inserting the second fastening members B2 through second insertion holes 62a formed in the second unit 62 and into the second fastening holes H2a. In this example, a female screw is formed on an inner peripheral surface of each first fastening hole H1a, and by having the female screw screwed with a male screw formed on an outer peripheral surface of each first fastening member B1, the first fastening members B1 and the first fastening holes H1a are fastened. As a result, the second unit 62 is fixed to the second fixing portions H2. For example, a plurality of (six in the illustrated example) second insertion holes 62a are formed along an outer edge of the second unit 62, and the same number of second fastening holes H2a (second fixing portions H2) as the second insertion holes 62a are formed at positions corresponding to each of the second insertion holes 62a on the second mounting surface C2.

In this way, the first unit 61, the second unit 62, and the cooler C are fixed to each other before being housed in the case 7. Thus, as shown in FIG. 5, the first unit 61, the second unit 62, and the cooler C can be housed in the case 7 in an integrated state. Thus, workability when the inverter 6 including the plurality of units 61, 62 is housed in the case 7 can be improved. Further, since the first unit 61, the second unit 62, and the cooler C can be housed in the main body portion 71 from the common opening portion 710 in a state in which the first unit 61, the second unit 62, and the cooler C are integrated, there is no need to provide a plurality of opening portions or housing spaces each corresponding to the plurality of units 61, 62 in the case 7, and the increase in size of the case 7 can be suppressed.

As shown in FIG. 5, the main body portion 71 of the case 7 includes third fixing portions H3 to which the cooler C is fixed. In the present embodiment, the third fixing portions H3 correspond to "fixing portions". The cooler C is fixed to the third fixing portions H3 by N third fastening members B3 (in which N is a natural number). The third fastening members B3 are shaft-shaped fastening members such as bolts. The number N of the third fastening members B3 is set in accordance with the number of the third fixing portions H3 (third fastening holes H3a described later). In the present embodiment, the third fastening members B3 correspond to "fastening members".

The third fixing portions H3 include the third fastening holes H3a into which the N third fastening members B3 are each inserted. In the present embodiment, the third fastening holes H3a correspond to "fastening holes". The cooler C is fixed to the third fixing portions H3 by inserting the third fastening members B3 through third insertion holes Ca formed in the cooler C and into the third fastening holes H3a. In this example, a female screw is formed on an inner peripheral surface of each third fastening hole H3a, and by having the female screw screwed with a male screw formed on an outer peripheral surface of each third fastening member B3, the third fastening members B3 and the third fastening holes H3a are fastened. As a result, the cooler C is fixed to the third fixing portions H3. In this example, the third insertion holes Ca are formed in each of the first mounting surface C1 and the second mounting surface C2 in the cooler C. In the illustrated example, the third insertion holes Ca are formed at a plurality of positions (for example, four positions) on the first mounting surface C1 and at a plurality of positions (for example, four positions) on the second mounting surface C2. Further, the same number of third fastening holes H3a (third fixing portions H3) as the third insertion holes Ca are formed at positions corresponding to each of the third insertion holes Ca in the main body portion 71 of the case 7.

As shown in FIG. 5, at least a part of the N third fastening holes H3a is provided so that virtual lines IL along an insertion direction Z, which is a direction in which the third fastening members B3 are inserted into the third fastening holes H3a, pass through the opening portion 710 of the case 7. In the present embodiment, each of the N third fastening holes H3a is provided so that the virtual lines IL along the insertion direction Z passes through the opening portion 710 of the case 7. In other words, in a state in which the third fastening members B3, which are shaft-shaped fastening members, are inserted in the third fastening holes H3a and fastened at the third fixing portions H3, extension lines (virtual lines IL) along the axial direction of the third fastening members B3 pass through the opening portion 710 of the case 7. Thus, when the work of fixing the cooler C to the third fixing portions H3 with the third fastening members B3 is performed, the work of fastening the third fastening members B3 through the opening portion 710 can be easily performed.

As described above, with the vehicle drive device 100 according to the present embodiment, it is possible to make workability of the inverter 6 housed in the case 7 satisfactory, while ensuring mountability onto the vehicle.

Other Embodiments

Next, other embodiments of the vehicle drive device will be described.

(1) In the embodiment described above, an example is described in which the rotating body (output shaft 50) that has the rotation shaft with the different shaft from the rotation shaft (rotor shaft 10) of the rotary electric machine 1 is disposed inside the case 7 and more to the first direction first side X1 than the first unit 61. However, without being limited to such an example, the rotating body may not be disposed inside the case 7. Further, even when the rotating body is disposed inside the case 7 as in the above embodiment, the rotating body is not limited to the output shaft 50. A rotation element provided at any position in the power transmission path connecting the rotating electric machine 1 (driving force source) and the wheels 9 can be the rotating body.

(2) In the embodiment described above, an example is described in which the third wall portion W3 includes the bulge portion 712 that bulges to the first direction first side X1, on the second direction second side Y2 of the main body flange portion 711. However, without being limited to such an example, and the third wall portion W3 may be configured not to include the bulge portion 712.

(3) In the embodiment described above, an example is described in which the first connecting portion 81, which is the connecting portion between the first unit 61 and the outside of the case 7 is provided in the third wall portion W3. However, without being limited to such an example, the first connecting portion 81 may be provided on another wall portion W other than the third wall portion W3, such as the first wall portion W1.

(4) In the embodiment described above, an example is described in which the second connecting portion 82, which is the connecting portion between the second unit 62 and the outside of the case 7, is provided in the part that configures the second wall portion W2 of the main body portion 71. However, without being limited to such an example, the second connecting portion 82 may be provided on another wall portion W other than the second wall portion W2, such as the fourth wall portion W4. Further, when the second connecting portion 82 is provided on the second wall portion W2, the second connecting portion 82 may be provided in a part that configures the second wall portion W2 in the cover portion 72, instead of a part that configures the second wall portion W2 in the main body portion 71.

(5) In the embodiment described above, an example is described in which the first reference plane FR1 and the second reference plane FR2 are orthogonal to each other. However, without being limited to such an example, the first reference plane FR1 and the second reference plane FR2 may be disposed so as to intersect at an angle other than 90°. In this case, an intersection angle of the first reference plane FR1 and the second reference plane FR2 can be, for example, an angle within a range of 60° to 150°, more preferably 80° to 120°.

(6) In the embodiment described above, an example is described in which the first unit 61 includes the switching element unit 61A, the inverter control device 61B (control board), and the heat sink 61C, and the second unit 62 includes the smoothing capacitor 62A. However, without being limited to such an example, the configuration opposite to the above, that is, a configuration in which the first unit 61 includes the smoothing capacitor 62A, and the second unit 62 includes the switching element unit 61A, the inverter control device 61B (control board), and heat sink 61C may be provided. Alternatively, each component of the first unit 61 and the second unit 62 may be in a combination other than the above.

(7) In the embodiment described above, an example is described in which the configuration is such that the main body portion 71 includes the main body flange portion 711, and the cover portion 72 includes the cover flange portion 721. However, the configuration is not limited to such an example. For example, one or both of the main body portion 71 and the cover portion 72 may not have a flange portion that protrudes outward along the joining plane F.

(8) In the embodiment described above, an example is described in which the configuration is such that the second unit 62 is disposed more to the first direction second side X2 than the first unit 61, and the end portion of the second unit 62 on the second direction first side Y1 is disposed more to the second direction second side Y2 than the end portion of the first unit 61 on the second direction first side Y1. However, the configuration is not limited to such an example. For example, when the second unit 62 is disposed more to the first direction second side X2 than the first unit 61, the end portion on the second direction first side Y1 of the second unit 62 and the end portion on the second direction first side Y1 of the first unit 61 may be disposed at the same position in the second direction Y. Alternatively, the end portion on the second direction first side Y1 of the second unit 62 may be disposed more to the second direction first side Y1 than the end portion on the second direction first side Y1 of the first unit 61.

(9) In the embodiment described above, an example is described in which each of the N third fastening holes H3a is provided so that the virtual lines IL along the insertion direction Z in which the third fastening members B3 are inserted pass through the opening portion 710 of the case 7. However, without being limited to such an example, some of the N third fastening holes H3a may be provided so that the virtual lines IL along the insertion direction Z in which the third fastening members B3 are inserted do not pass through the opening portion 710 of the case 7.

(10) The configuration disclosed in each of the above-described embodiments can be applied in combination with the configurations disclosed in other embodiments as long as there is no contradiction. With respect to other configurations, the embodiments disclosed herein are merely exemplary in all respects. Therefore, various modifications can be made as appropriate without departing from the spirit of the present disclosure.

Outline of Embodiment Described Above

Hereinafter, the vehicle drive device described above will be described.

A vehicle drive device (100) includes: a rotary electric machine (1) that has a cylindrical shape; an inverter (6) that drivingly controls the rotary electric machine (1); and a case (7) for housing the rotary electric machine (1) and the inverter (6), in which the case (7) includes a main body portion (71) and a cover portion (72), in which the main body portion (71) houses the rotary electric machine (1) and at least a part of the inverter (6), the cover portion (72) is joined to the main body portion (71) so as to cover an opening portion (710) of the main body portion (71), a virtual plane parallel to a tangent plane set on an outer peripheral surface (11) of the rotary electric machine (1) is set as a first reference plane (FR1), and a virtual plane parallel to another tangent plane intersecting with the first reference plane (FR1) is set as a second reference plane (FR2), the inverter (6) includes a cooler (C), a first unit (61) that is fixed to the cooler (C) so as to be along the first reference plane (FR1), and a second unit (62) that is fixed to the cooler (C) so as to be along the second reference plane (FR2), and the cooler (C) is fixed to the main body portion (71).

According to this configuration, since the first unit (61), the second unit (62), and the cooler (C) are fixed to each other, the first unit (61), the second unit (62), and the cooler (C) can be housed in the case (7) in an integrated state. Thus, workability when housing the inverter (6), which includes each of the above units (61, 62), in the case (7) can be improved. Further, since the first unit (61), the second unit (62), and the cooler (C) can be housed in the main body portion (71) from the common opening portion (710) in a state in which the first unit (61), the second unit (62), and the cooler (C) are integrated, there is no need to provide a plurality of opening portions or housing spaces each corresponding to the plurality of units (61, 62) in the case (7), and the increase in size of the case (7) can be suppressed. Thus, according to this configuration, it is possible to realize the vehicle drive device (100) that has good workability and mountability onto a vehicle.

Here, it is preferable that the cooler (C) include a first mounting surface (C1) that is along the first reference plane (FR1) and to which the first unit (61) is mounted, and a second mounting surface (C2) that is along the second reference plane (FR2) and to which the second unit (62) is mounted.

According to this configuration, the first unit (61) can be appropriately fixed to the cooler (C) so as to be along the first reference plane (FR1), and the second unit (62) can be appropriately fixed to the cooler (C) so as to be along the second reference plane (FR2).

It is preferable that the main body portion (71) include a fixing portion (H3) to which the cooler (C) is fixed, the cooler (C) be fixed to the fixing portion (H3) by N fastening members (B3), N being a natural number, the fixing portion (H3) include fastening holes (714A) into which each of the N fastening members (B3) is inserted, and each of the N fastening holes (H3a) be provided so that a virtual line (IL) along an insertion direction (Z), which is a direction in which the fastening member (B3) is inserted with respect to the fastening hole (H3a), passes through the opening portion (710).

According to this configuration, since the virtual line (IL) along the insertion direction (Z) of the fastening member (B3) passes through the opening portion (710) of the case (7), when work of fastening the cooler (C) to the fixing portion (H3) with the fastening member (B3) is performed, work of fastening the fastening member (B3) through the opening portion (710) can be easily performed. Thus, it is possible to realize the vehicle drive device (100) that has good workability.

It is preferable that each of the first unit (61) and the second unit (62) be disposed on an opposite side of the cooler (C) from the rotary electric machine (1) side.

According to this configuration, the first unit (61) and the second unit (62) can be made less susceptible to the influence of heat from the rotary electric machine (1).

It is preferable that a joining plane (F) at which the main body portion (71) and the cover portion (72) are joined be inclined with respect to both the first reference plane (FR1) and the second reference plane (FR2).

According to this configuration, since the joining plane (F) of the main body portion (71) and the cover portion (72) is inclined with respect to both the first reference plane (FR1) and the second reference plane (FR2), the opening portion (710) of the main body (71) is also provided so as to be inclined to both the first unit (61) disposed along the first reference plane (FR1) and the second unit (62) disposed along the second reference plane (FR2). Thus, it is possible to secure a wide opening area of the opening portion (710) corresponding to the part of the main body portion (71) that houses the inverter (6). As a result, since the number of opening portions (710) provided in the main body portion (71) can be suppressed to a small number, the size of the case (7) can be suppressed and mountability onto the vehicle can be easily ensured.

Further, it is preferable that at least a part of the inverter (6) protrude from the opening portion (710), and the cover portion (72) house the part of the inverter (6) that protrudes from the opening portion (710).

According to this configuration, in a state in which the cover portion (72) is removed, a part of the inverter (6) protrudes from the opening portion (710) of the main body portion (71). Thus, according to this configuration, since a part of the inverter (6) protrudes from the opening portion (710) in a state in which the cover portion (72) is removed from the main body portion (71), workability such as for assembling and removing the inverter (6) can be ensured when manufacturing or repairing the vehicle drive device (100).

It is preferable that the case (7) have a first wall portion (W1) disposed along the first reference plane (FR1) so as to cover the first unit (61), and a second wall portion (W2) disposed along the second reference plane (FR2) so as to cover the second unit (62), the main body portion (71) include a main body flange portion (711) that forms a main body side joining surface portion (F1) that is a joining plane (F) on the main body portion (71) side among the joining plane (F) at which the main body portion (71) and the cover portion (72) are joined, and that is formed so as to protrude outward along the joining plane (F) from an outer wall of the main body portion (71), the cover portion (72) include a cover flange portion (721) that forms a cover side joining surface portion (F2) that is the joining plane (F) on the cover portion (72) side among the joining plane (F), and that is formed so as to protrude outward along the joining plane (F) from an outer wall of the cover portion (72), and the main body flange portion (711) and the cover flange portion (721) joined to each other be formed so as to protrude outward of the case (7) with respect to at least one of the first wall portion (W1) and the second wall portion (W2).

According to this configuration, by using the main body flange portion (711) and the cover flange portion (721), the main body portion (71) and the cover portion (72) can be appropriately joined with a fastening member such as a bolt. In particular, as described above, the configuration is such that when the joining plane (F) at which the main body portion (71) and the cover portion (72) are joined is inclined with respect to both the first reference plane (FR1) and the second reference plane (FR2), and a part of the inverter (6) is disposed so as to protrude from the opening portion (710) of the main body (71) as described above, the protruding position can easily be set as a position avoiding the corner portion at which the first wall portion (W1) and the second wall portion (W2) intersect. Thus, the overall shape of the case (7) can be easily made into a shape in which the corner portions do not protrude, and as a result, it is possible to realize the vehicle drive device (100) that has satisfactory mountability onto a vehicle.

It is preferable that in an axial view with reference to a rotation shaft (10) of the rotary electric machine (1), a direction along the first reference plane (FR1) be set as a first direction (X), and one side in the first direction (X) be set as a first direction first side (X1) and the other side in the first direction (X) be set as a first direction second side (X2), in the axial view, a direction along the second reference plane (FR2) be set as a second direction (Y), and one side in the second direction (Y) be set as a second direction first side (Y1) and the other side in the second direction (Y) be set as a second direction second side (Y2), in the second direction (Y), a side from the opening portion (710) toward an inside of the main body portion (71) be the second direction second side (Y2), the second unit (62) be disposed more to the first direction second side (X2) than the first unit (61), an end portion on the second direction first side (Y1) of the second unit (62) be disposed more to the second direction second side (Y2) than an end portion on the second direction first side (Y1) of the first unit (61), and a joining plane (F) at which the main body portion (71) and the cover portion (72) are joined be inclined to the second direction second side (Y2), toward the first direction second side (X2).

According to this configuration, the joining plane (F) of the main body portion (71) and the cover portion (72) is easily suppressed from being disposed in the corner portion that is on the first direction second side (X2) and on the second direction first side (Y1), in the case (7). Further, according to this configuration, the end portion on the second direction first side (Y1) of the second unit (62) is disposed more to the inner side of the main body portion (71) than the end portion on the second direction first side (Y1) of the first unit (61). Therefore, it is easy to form the case (7) in a shape in which the corner portion that is on the first direction second side (X2) and on the second direction first side (Y1), in the case (7), does not protrude. Thus, according to this configuration, the overall shape of the case (7) can be easily made into a shape in which the corner portions do not protrude, and as a result, it is possible to realize the vehicle drive device (100) that has satisfactory mountability onto a vehicle.

It is preferable that a rotating body (50) that has a rotation shaft with a different shaft from the rotation shaft (10) of the rotary electric machine (1) be disposed inside the case (7) and more to the first direction first side (X1) than the first unit (61).

According to this configuration, with respect to the first unit (61), the rotating body (50) is disposed on the first direction first side (X1), and the second unit (62) is disposed on the first direction second side (X2) that is the opposite side of the first direction first side (X1). Thus, according to this configuration, the first unit (61), the second unit (62), and the rotating body (50) can be efficiently disposed inside the case (7). As a result, it is possible to suppress the increase in size of the case (7), and mountability onto the vehicle is easily ensured.

It is preferable that the main body portion (71) include a main body flange portion (711) that forms a main body side joining surface portion (F1) that is a joining plane (F) on the main body portion (71) side among the joining plane (F) in which the main body portion (71) and the cover portion (72) are joined, and that is formed so as to protrude outward along the joining plane (F) from an outer wall of the main body portion (71), the cover portion (72) include a cover flange portion (721) that forms a cover side joining surface portion (F2) that is the joining plane (F) on the cover portion (72) side among the joining plane (F), and that is formed so as to protrude outward along the joining plane (F) from an outer wall of the cover portion (72), and the main body portion (71) include a third wall portion (W3) that covers the rotary electric machine (1) and the inverter (6), on the first direction first side (X1) of the first unit (61), the third wall portion (W3) include a bulge portion (712) that bulges to the first direction first side (X1), on the second direction second side (Y2) of the main body flange portion (711), and end portions on the first direction first side (X1) of the main body flange portion (711) and the cover flange portion (721) be disposed more to the first direction second side (X2) than an end portion on the first direction first side (X1) of the bulge portion (712).

According to this configuration, since the end portions on the first direction first side (X1) of the main body flange portion (711) and the cover flange portion (721) are disposed more to the first direction second side (X2) than the end portion on the first direction first side (X1) of the bulge portion (712), the end portions on the first direction first side (X1) of the main body flange portion (711) and the cover flange portion (721) are disposed at the positions avoiding the corner portion of the case (7). Thus, according to this configuration, the overall shape of the case (7) can be easily made into a shape in which the corner portions do not protrude, and as a result, it is possible to realize the vehicle drive device (100) that has satisfactory mountability onto a vehicle.

It is preferable that a first connecting portion (81), which is a connecting portion of the first unit (61) and an outside of the case (7), be provided more to the second direction second side (Y2) than the main body flange portion (711) and more to the second direction first side (Y1) than the bulge portion (712), in the third wall portion (W3).

According to this configuration, it is possible to appropriately make an electrical connection and other connections between the first unit (61) and the outside. Further, according to this configuration, even when the first connecting portion (81) has a shape protruding from the case (7), since the first connecting portion (81) is provided between the main body flange portion (711) and the bulge portion (712) that are also protruded, a protruding amount with respect to the entire case (7) of the first connecting portion (81) can be suppressed to be small. As a result, it becomes possible to realize the vehicle drive device (100) that has satisfactory mountability onto a vehicle.

It is preferable that the case (7) have a first wall portion (W1) disposed along the first reference plane (FR1) so as to cover the first unit (61), and a second wall portion (W2) disposed along the second reference plane (FR2) so as to cover the second unit (62), and a second connecting portion (82), which is a connecting portion between the second unit (62) and an outside of the case (7), be provided in a part that configures the second wall portion (W2) of the main body portion (71).

According to this configuration, it is possible to appropriately make an electrical connection and other connections between the second unit (62) and the outside.

Also, it is preferable that the first reference plane (FR1) and the second reference plane (FR2) be orthogonal to each other.

According to this configuration, the first unit (61) disposed along the first reference plane (FR1) and the second unit (62) disposed along the second reference plane (FR2) can be efficiently disposed inside the case (7). As a result, it is possible to suppress the increase in size of the case (7), and mountability onto the vehicle is easily ensured.

It is preferable that the first unit (61) include a switching element unit (61A) including a plurality of switching elements that configure an inverter circuit, and the second unit (62) include a smoothing capacitor (62A).

According to this configuration, a heating element such as a switching element or the smoothing capacitor (62A) can be housed in the case (7) in a state in which the heating element can be appropriately cooled by the cooler (C).

INDUSTRIAL APPLICABILITY

The technique according to the present disclosure can be used for a vehicle drive device including a rotary electric machine that has a cylindrical shape, an inverter that drivingly controls the rotary electric machine, and a case for housing the rotary electric machine and the inverter.

DESCRIPTION OF THE REFERENCE NUMERALS

100: vehicle drive device
1: rotary electric machine
11: outer peripheral surface of rotary electric machine
2: input member
6: inverter
61: first unit
62: second unit
7: case
71: main body portion
710: opening portion
711: main body flange portion
712: bulge portion
72: cover portion
721: cover flange portion
50: output shaft (rotating body)
81: first connecting portion
82: second connecting portion
F: joining plane
F1: main body side joining surface portion
F2: cover side joining surface portion
FR1: first reference plane
FR2: second reference plane
W1: first wall portion
W2: second wall portion
W3: third wall portion
X: first direction
X1: first direction first side
X2: first direction second side
Y: second direction
Y1: second direction first side
Y2: second direction second side

The invention claimed is:

1. A vehicle drive device comprising:
a rotary electric machine that has a cylindrical shape;
an inverter that drivingly controls the rotary electric machine; and
a case for housing the rotary electric machine and the inverter, wherein
the case includes a main body portion and a cover portion,
the main body portion houses the rotary electric machine and at least a part of the inverter,
the cover portion is joined to the main body portion so as to cover an opening portion of the main body portion,
a virtual plane parallel to a tangent plane set on an outer peripheral surface of the rotary electric machine is set as a first reference plane, and a virtual plane parallel to another tangent plane intersecting with the first reference plane is set as a second reference plane,
the inverter includes a cooler, a first unit that is fixed to the cooler via a first mounting surface that is parallel to the first reference plane, and a second unit that is fixed to the cooler via a second mounting surface that is parallel to the second reference plane,
the cooler is fixed to the main body portion, and
a joining plane at which the main body portion and the cover portion are joined is inclined with respect to both the first reference plane and the second reference plane.

2. The vehicle drive device according to claim 1, wherein
the main body portion includes a fixing portion to which the cooler is fixed,
the cooler is fixed to the fixing portion by N fastening members, N being a natural number,
the fixing portion includes fastening holes into which each of the N fastening members is inserted, and
each of the N fastening holes is provided so that a virtual line along an insertion direction, which is a direction in which the fastening member is inserted with respect to the fastening hole, passes through the opening portion.

3. The vehicle drive device according to claim 1, wherein each of the first unit and the second unit is disposed on an opposite side of the cooler from the rotary electric machine side.

4. The vehicle drive device according to claim 1, wherein
at least a part of the inverter protrudes from the opening portion, and
the cover portion houses the part of the inverter that protrudes from the opening portion.

5. The vehicle drive device according to claim 1, wherein
the case has a first wall portion disposed along the first reference plane so as to cover the first unit, and a second wall portion disposed along the second reference plane so as to cover the second unit,
the main body portion includes a main body flange portion that forms a main body side joining surface portion that is a joining plane on the main body portion side among the joining plane at which the main body portion and the cover portion are joined, and that is formed so as to protrude outward along the joining plane from an outer wall of the main body portion,
the cover portion includes a cover flange portion that forms a cover side joining surface portion that is the joining plane on the cover portion side among the joining plane, and that is formed so as to protrude outward along the joining plane from an outer wall of the cover portion, and
the main body flange portion and the cover flange portion joined to each other are formed so as to protrude outward of the case with respect to at least one of the first wall portion and the second wall portion.

6. The vehicle drive device according to claim 1, wherein
in an axial view with reference to a rotation shaft of the rotary electric machine, a direction along the first reference plane is set as a first direction, and one side in the first direction is set as a first direction first side and the other side in the first direction is set as a first direction second side,
in the axial view, a direction along the second reference plane is set as a second direction, and one side in the second direction is set as a second direction first side and the other side in the second direction is set as a second direction second side,
in the second direction, a side from the opening portion toward an inside of the main body portion is the second direction second side,
the second unit is disposed more to the first direction second side than the first unit,
an end portion on the second direction first side of the second unit is disposed more to the second direction second side than an end portion on the second direction first side of the first unit, and
the joining plane at which the main body portion and the cover portion are joined is inclined to the second direction second side, toward the first direction second side.

7. The vehicle drive device according to claim 6, wherein a rotating body that has a rotation shaft with a different shaft from the rotation shaft of the rotary electric machine is disposed inside the case and more to the first direction first side than the first unit.

8. The vehicle drive device according to claim 6, wherein
the main body portion includes a main body flange portion that forms a main body side joining surface portion that is a joining plane on the main body portion side among the joining plane at which the main body portion and the cover portion are joined, and that is formed so as to protrude outward along the joining plane from an outer wall of the main body portion,
the cover portion includes a cover flange portion that forms a cover side joining surface portion that is the joining plane on the cover portion side among the joining plane, and that is formed so as to protrude outward along the joining plane from an outer wall of the cover portion, and the main body portion includes a third wall portion that covers the rotary electric machine and the inverter, on the first direction first side of the first unit,
the third wall portion includes a bulge portion that bulges to the first direction first side, on the second direction second side of the main body flange portion, and
end portions on the first direction first side of the main body flange portion and the cover flange portion are disposed more to the first direction second side than an end portion on the first direction first side of the bulge portion.

9. The vehicle drive device according to claim 8, wherein a first connecting portion, which is a connecting portion of the first unit and an outside of the case, is provided more to the second direction second side than the main body flange portion and more to the second direction first side than the bulge portion, in the third wall portion.

10. The vehicle drive device according to claim 1, wherein
the case has a first wall portion disposed along the first reference plane so as to cover the first unit, and a second wall portion disposed along the second reference plane so as to cover the second unit, and
a second connecting portion, which is a connecting portion between the second unit and an outside of the case, is provided in a part that configures the second wall portion of the main body portion.

11. The vehicle drive device according to claim 1, wherein the first reference plane and the second reference plane are orthogonal to each other.

12. The vehicle drive device according to claim 1, wherein
the first unit includes a switching element unit including a plurality of switching elements that configure an inverter circuit, and
the second unit includes a smoothing capacitor.

13. The vehicle drive device according to claim 1, wherein the cooler is fixed to the main body portion at a plurality of positions along the first reference plane and a plurality of positions along the second reference plane.

* * * * *